United States Patent
Katz et al.

(10) Patent No.: US 6,315,437 B1
(45) Date of Patent: Nov. 13, 2001

(54) OUTSIDE REAR VIEW MIRROR

(75) Inventors: Werner Katz, Horb; Joerg-Uwe Koske, Simmozheim; Richard Merz, Starzach; Volker Nickel, Voehringen; Robert Schwed, Bad Teinach-Zavelstein, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/339,875

(22) Filed: Jun. 25, 1999

(30) Foreign Application Priority Data

Jun. 25, 1998 (DE) ............................... 198 28 253

(51) Int. Cl.$^7$ ...................................................... B60Q 1/00
(52) U.S. Cl. ........................... 362/494; 362/555; 362/84; 362/135; 340/475
(58) Field of Search .................... 362/135, 494, 362/84, 800, 551, 555, 583; 340/468, 475

(56) References Cited

U.S. PATENT DOCUMENTS

| | | | |
|---|---|---|---|
| 4,661,800 | * | 4/1987 | Yamazaki ............................. 362/494 |
| 5,402,103 | | 3/1995 | Tashiro . |
| 5,408,357 | * | 4/1995 | Beukema ............................. 362/494 |

FOREIGN PATENT DOCUMENTS

| | | |
|---|---|---|
| 82 21 895.1 | 1/1983 | (DE) . |
| 297 02 746 U1 | 5/1997 | (DE) . |
| 0858932 | 8/1998 | (EP) . |
| 6-81836 | 11/1994 | (JP) . |

OTHER PUBLICATIONS

Yano Heishichi, "Rearview Mirror with Direction Indicating Function", published Dec. 16, 1997, Publication No. 9–323584.

* cited by examiner

*Primary Examiner*—Thomas M. Sember
(74) *Attorney, Agent, or Firm*—Crowell & Moring LLP

(57) ABSTRACT

An outside rear view mirror is provided for vehicles. The outside rear view mirror has a mirror housing having an interior and exterior. There is provided at least one light exit opening in the mirror housing. Also included is a repeating flashing light having at least one light source associated with the light exit opening in the mirror housing. A luminous film is located on the exterior of the mirror housing. The light exit opening is filled at least partially with a light guide connected with the light source.

25 Claims, 2 Drawing Sheets

OUTSIDE REAR VIEW MIRROR

BACKGROUND AND SUMMARY OF THE INVENTION

This application claims the priority of German Patent Application No. 198 28 253.2, filed Jun. 25, 1998.

The invention relates to an outside rear view mirror for vehicles, preferably for motor vehicles.

In an outside rear view mirror of this type, known for example from DE 297 02 746 U1, a repeating flashing light is accommodated in a mirror housing. This repeating flashing light comprises a light source for producing a flashing light as well as a light exit opening provided in the mirror housing. The repeating flashing light is designed so that its flashing light is always directed toward an area opposite the travel direction.

This light, directed rearward relative to the vehicle, is provided in known outside rear view mirrors by the light being transmitted from the light source to the light exit opening by means of a light guide whose light exit end is located on the outside of the mirror housing in such fashion that the desired radiation direction results. In known outside rear view mirrors, the light source is at a point in the mirror housing which is located in the vicinity of the fastening of the mirror housing to a vehicle. The light guide which begins at the light source and ends at the light exit opening thus extends essentially over the entire length of the mirror housing.

In addition, the light guide extends from a beginning area in the vicinity of the light source up to the light exit opening inside the external contour of the mirror housing located forward in the travel direction, for which purpose a corresponding recess is provided in the wall of the mirror housing. The light guide, which is therefore visible from outside over a large area, is provided in a portion of the outside contour that extends approximately parallel to the travel direction with a profile at which the light transmitted by the light guide is radiated outward bundled or concentrated relative to the vehicle, in other words essentially transversely to the travel direction. The more light is radiated laterally into this profiled end area of the light guide, the less light can be radiated into the area directed rearward. With relatively weak light sources, this quickly creates a situation in which the amount of light radiated rearward no longer meets legal requirements.

In addition, the profile provided in the end area of the light guide produces a strictly structured radiation of the light that can be perceived by affected drivers as unpleasant.

The present invention is concerned with the problem of improving the radiation in an outside rear view mirror of the type recited at the outset and especially of increasing the radiation area.

This goal is achieved according to the invention by an outside rear view mirror with the features of claim 1.

The invention is based on the general idea of locating a luminous film in the area on the outside contour of the mirror housing in which additional radiation of flashing light is desired. A luminous film of this kind therefore produces an additional active light source itself which is supplied in suitable fashion with electrical energy and is operated parallel to or in synchronization with the light source in the interior of the mirror housing.

With the aid of the luminous film which can be located at any desired location on the outside contour of the mirror housing, the radiation area of the repeating flashing light can be expanded as desired. Preferably, the luminous film extends along the outside of the mirror housing located forward in the travel direction, so that an illuminated area can be produced that emits light transversely to the travel direction and also into a radiation area that is directed forward in the direction of travel.

Moreover, a luminous film exhibits a homogeneous light radiation along an entire surface that is perceived by affected drivers as pleasant.

The use of an additional light source has the advantage that the light source for supplying the light exit opening in the mirror housing can be made with relatively small dimensions. In this manner, for example, light-emitting diodes, LEDs for short, can be used as the light source. The use of LEDs has the following advantages among others: an LED is permanently installed, so its electrical contacts have no corrosion problems. LEDs operate nearly without wear and develop hardly any heat while generating light, so that they can be accommodated in the smallest spaces.

According to a preferred embodiment of the outside rear view mirror according to the invention, a disk that is permeable to light can be mounted externally on the luminous film, which preferably is located at least partially inside the outside contour of the mirror housing. With the aid of this measure, the luminous film can be protected, especially against stones or the like, with the disk being manufactured from a plastic for example. In addition, it is possible to provide the disk with optics that influence the light emitted by the luminous film and penetrating the disk. This is desirable for example when the luminous film radiates so-called "cold light," which is frequently perceived as unpleasant. The optics can then convert the cold light into so-called "warm light" in the disk. This "warm light" is perceived by affected drivers as more pleasant. The disk is equipped with so-called Fresnel optics for this purpose, for example.

Additional important features and advantages of the outside rear view mirror according to the invention follow from the subclaims, the following drawings, and the accompanying description of the figures with reference to the drawings.

It is understood that the features listed above and explained below can be used not only in the combination described but also in other combinations or alone without departing from the framework of the present invention.

Other objects, advantages and novel features of the present invention will become apparent from the following detailed description of the invention when considered in conjunction with the accompanying drawings.

BRIEF DESCRIPTION OF THE DRAWINGS

Preferred embodiments of the invention are shown in the drawings and explained in great detail in the following specification. The following are shown schematically.

DETAILED DESCRIPTION OF THE DRAWINGS

Figure 1:
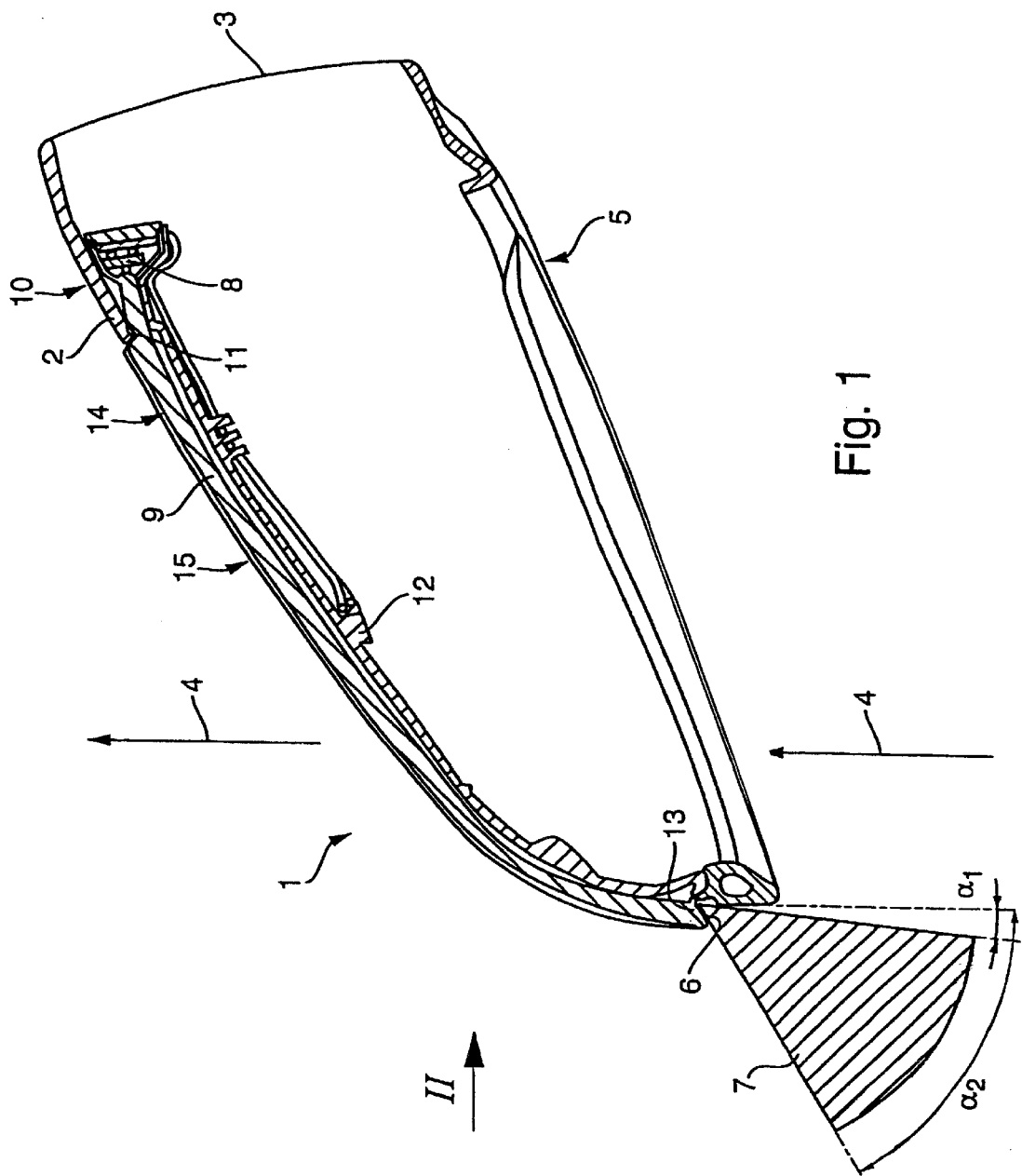
FIG. 1 is a sectional top view of an outside rear view mirror according to the invention.

According to FIG. 1, an outside rear view mirror 1 according to the invention has a mirror housing 2 that can be fastened by a foot end 3 to a vehicle, not shown, especially an automobile. The outside rear view mirror 1 is fastened to the vehicle so that the direction of travel of the vehicle is approximately in the direction of arrows 4.

In a housing side 5 which is at the rear in travel direction 4, an opening is provided in which a glass carrier plate, not shown, is mounted in mirror housing 2, preferably so that it can be adjusted by an electric motor. The glass carrier plate carries a rear view mirror that allows the driver of the vehicle to see the traffic opposite travel direction 4.

Mirror housing 2, at one end which faces away from foot end 3, has a light exit opening 6 through which flashing light from a repeating flashing light integrated into rear view mirror 1 can be radiated opposite travel direction 4. In the embodiment shown in FIG. 1, the flashing light is radiated in a radiation area 7 located between a first angle alpha 1 and a second angle alpha 2 relative to travel direction 4. In a preferred embodiment, angle alpha 1 is approximately 5 degrees and angle alpha 2 is approximately 60 degrees.

In addition to light exit opening 6, the repeating flashing light of the outside rear view mirror 2 also comprises a light source 8, which in the embodiment is in the form of an LED or a row of parallel LEDs. An LED 8 is located in the vicinity of foot end 3 inside mirror housing 2. There is sufficient space at this location for installing LED 8 and only relatively short electrical leads are required. The flashing light is transmitted from light source 8 to light exit opening 6 by a light guide 9 that extends inside the outside contour of mirror housing 2 that is forward in travel direction 4 along an exterior 10 of mirror housing 2 that is forward in travel direction 4. For this purpose, a window 11 is cut in the forward outer side 10 of mirror housing 2, said window being completely filled by light guide 9. A mount 12 is located inside mirror housing 2, said mount holding light guide 9 in mirror housing 2.

Light guide 9 transmits the flashing light emitted by the LED or the row of LEDs 8 essentially with zero loss, in other words without any radiation transversely to the lengthwise direction of light guide 9 up to a light exit end 13 of light guide 9 that faces away from LED 8. The light exit end 13 of light guide 9 is optically designed so that the desired radiation area 7 is formed. As a result, the light exit end 13 of light guide 9 forms the light exit opening 6 of mirror housing 2.

On the outside of light guide 9 that runs inside the outside contour of mirror housing 2, a luminous film 14 is applied which, like light guide 9, extends essentially along the entire side 10 of the housing located forward in travel direction 4.

At a location that is not shown, luminous film 14 is supplied with electrical energy by which it can be excited to glow in order to radiate a flashing light forward in the travel direction and transversely to travel direction 4. Preferably, luminous film 14 is controlled in synchronization with LED 8 in order to produce a synchronous flashing light.

The repeating flashing light thus created accordingly has a radiation area 7 that is formed by light guide 9 and directed essentially opposite travel direction 4, with the brightness of the light from the flashing light in this radiation area 7 clearly being able to meet legal requirements. In addition, the repeating flashing light also has the luminous area formed by luminous film 14, radiated forward and laterally in travel direction 4. Luminous film 14 produces a homogeneous radiated light over its entire surface, in other words a brightness that remains approximately constant over the entire radiation surface.

A disk 15 is mounted on the outside of luminous film 14 by which luminous film 14 is protected, particularly against contamination and damage. Disk 15 simultaneously protects light guide 9. In addition to the protective function of disk 15, the disk can also serve to change the light that is radiated through luminous film 14, with disk 15 being equipped with corresponding optics.

The flashing light that can be produced with the proposed repeating flashing light in outside rear view mirror 1 according to the invention can be seen at a great distance from the rear relative to travel direction 4 and can also be seen clearly from the side and front, so that the safety with which a vehicle equipped with outside rear view mirror 1 according to the invention moves in traffic is increased.

Figure 2:
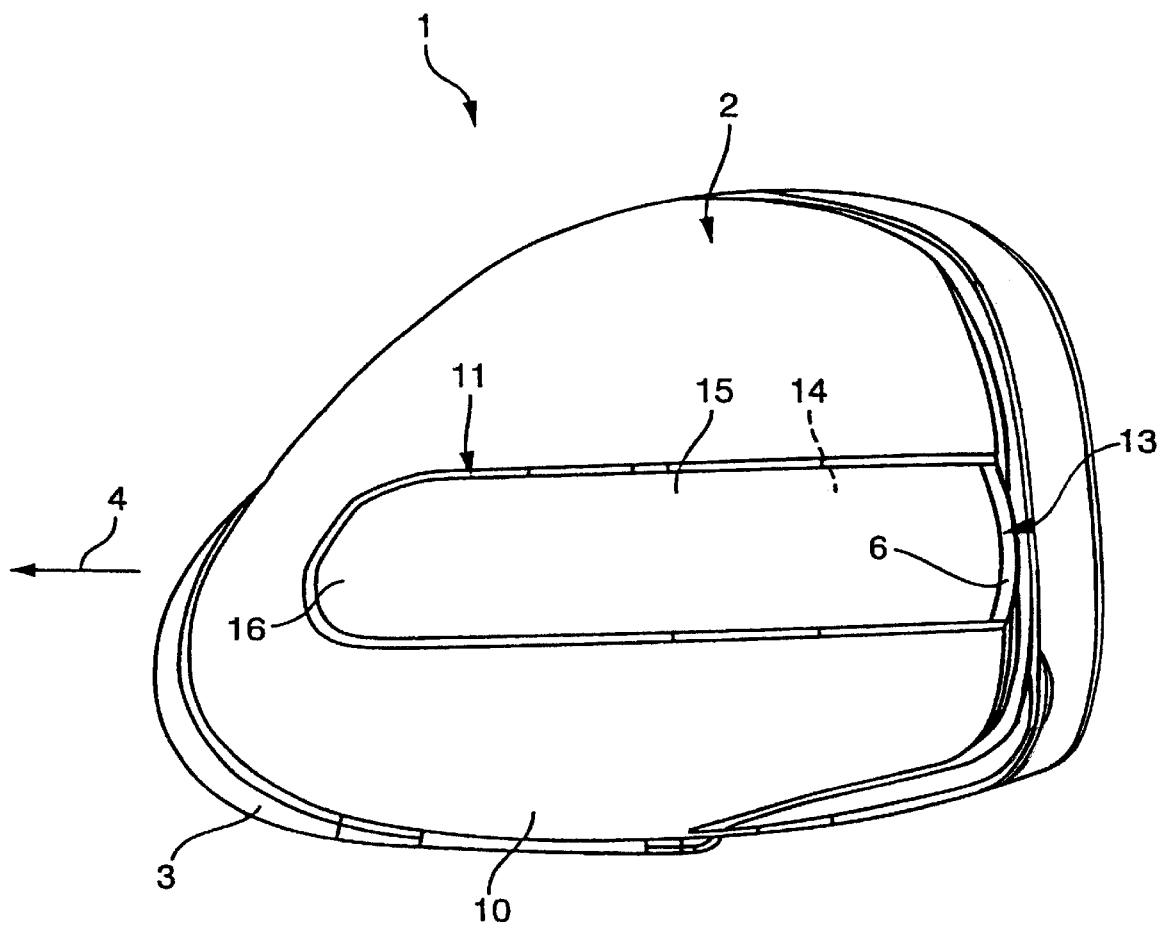
FIG. 2 is a side view of the outside rear view mirror according to arrow II in FIG. 1.

It is clear from FIG. 2 that luminous film 14 extends essentially along the entire forward exterior 10 of mirror housing 2 relative to the travel direction 4 of the vehicle. As far as the vertical axis is concerned, the area of the front housing side 10 of mirror housing 2 covered by luminous film 14 takes up only approximately a quarter or a third of the entire exterior, approximately at its center. In this fashion, luminous film 14 forms an approximately strip-shaped or stripe-shaped radiation area for the flashing light.

The light exit end 13 of light guide 9 located beneath luminous film 14, as shown in FIG. 2, is made convex in order to expand the radiation area 7 directed essentially opposite travel direction 4 vertically upward and downward.

With a suitable design of the end area of 16 of luminous film 14 or of disk 15 opposite light exit end 13, the radiation area can be adapted aesthetically to the aerodynamic shape of the outside rear view mirror 1. Then light guide 9 preferably adopts the same shape at the point where it passes through window 11.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An outside rear view mirror for vehicles, comprising:
   a mirror housing having a foot end adapted to be fastened to a vehicle and an opposite end spaced from the foot end,
   a light source for a repeating flashing light disposed at said foot end of the mirror housing,
   a light exit opening at said opposite end of the mirror housing,
   a light guide operable to guide light from the light source to the light exit opening with said light radiating into a luminous area opposite a direction of travel when in an in use position on a forward traveling vehicle, and
   a luminous film disposed on an exterior surface of the mirror housing spaced from the light exit opening and operable to radiate a flashing light,
   wherein said light source and luminous film are activated in synchronization to produce a repeating flashing light.

2. Outside rear view mirror according to claim 1, wherein the luminous film extends along an exterior of the mirror housing that is forward in a vehicle travel direction and covers the exterior at least partially.

3. Outside rear view mirror according to claim 2, wherein the area covered on the outside of the mirror housing by the luminous film is designed essentially as a stripe, with the lengthwise direction of the stripe extending approximately transversely to the travel direction.

4. Outside rear view mirror according to claim 3, wherein a light-permeable disk is mounted externally on the luminous film.

5. Outside rear view mirror according to claim 3, wherein said light guide and exit opening are configured to radiate the flashing light in a radiation area located between first and second angular directions with respect to the vehicle travel direction.

6. Outside rear view mirror according to claim 5, wherein said first angular direction is approximately 5° and the second angular direction is approximately 60° with respect to the vehicle travel direction.

7. Outside rear view mirror according to claim 2, wherein a light-permeable disk is mounted externally on the luminous film.

8. Outside rear view mirror according to claim 1, wherein a light-permeable disk is mounted externally on the luminous film.

9. Outside rear view mirror according to claim 8, wherein the disk is located at least partially inside an outside contour of the mirror housing.

10. Outside rear view mirror according to claim 9, wherein the disk has optics that influence the light passing through the disk.

11. Outside rear view mirror according to claim 8, wherein the disk has optics that influence the light passing through the disk.

12. Outside rear view mirror according to claim 1, wherein the light exit opening is filled at least partially with the light guide connected with the light source.

13. Outside rear view mirror according to claim 12, wherein the light guide extends at least partially along the exterior of the mirror housing that is forward in the travel direction and is located inside an outside contour of the mirror housing.

14. Outside rear view mirror according to claim 4, wherein the light exit opening is essentially formed by an end edge of the light guide that faces away from the light source.

15. Outside rear view mirror according to claim 13, wherein the luminous film is mounted externally on the area of the light guide that extends forward in the travel direction on the outside of the mirror housing.

16. Outside rear view mirror according to claim 15, wherein the light exit opening is essentially formed by an end edge of the light guide that faces away from the light source.

17. Outside rear view mirror according to claim 12, wherein the light exit opening is essentially formed by an end edge of the light guide that faces away from the light source.

18. Outside rear view mirror according to claim 1, wherein the light source is a light-emitting diode (LED).

19. Outside rear view mirror according to claim 1, wherein said light guide and exit opening are configured to radiate the flashing light in a radiation area located between first and second angular directions with respect to the vehicle travel direction.

20. Outside rear view mirror according to claim 19, wherein said first angular direction is approximately 5° and the second angular direction is approximately 60° with respect to the vehicle travel direction.

21. An outside rear view mirror according to claim 1, wherein said light exit opening is configured to radiate the flashing light in a radiation area located between first and second angular directions with respect to a vehicle forward travel direction.

22. An outside rear view mirror for vehicles, comprising:

a mirror housing, a light exit opening in the mirror housing, a light source for supplying light to the light exit opening, and a luminous film located on an exterior of the mirror housing at a position spaced from the light exit opening, wherein said light exit opening is configured to radiate the flashing light in a radiation area located between first and second angular directions with respect to a vehicle forward travel direction, wherein said mirror housing has a foot end adapted to be fastened to a vehicle and an opposite end spaced from the foot end, wherein said exit opening is disposed at said opposite end of the mirror housing, and wherein the at least one light source is disposed at said foot end of the mirror housing.

23. Outside rear view mirror according to claim 22, wherein said first angular direction is approximately 5° and the second angular direction is approximately 60° with respect to the vehicle travel direction.

24. Outside rear view mirror according to claim 22, wherein said luminous film is disposed intermediate said foot end and opposite end and faces in a forward vehicle travel direction.

25. Outside rear view mirror according to claim 24, wherein said light source and luminous film are activated in synchronization to produce a repeating flashing light.

* * * * *